(12) United States Patent
Kempter

(10) Patent No.: US 8,562,169 B2
(45) Date of Patent: Oct. 22, 2013

(54) HEAT DISSIPATING CHASSIS FOR HANDHELD BATTERY OPERATED DEVICE

(75) Inventor: Mark Kempter, Plano, TX (US)

(73) Assignee: Bayco Products, Inc., Wylie, TX (US)

( * ) Notice: Subject to any disclaimer, the term of this patent is extended or adjusted under 35 U.S.C. 154(b) by 408 days.

(21) Appl. No.: 12/956,973

(22) Filed: Nov. 30, 2010

(65) Prior Publication Data

US 2012/0132408 A1    May 31, 2012

(51) Int. Cl.
*F28F 7/00* (2006.01)

(52) U.S. Cl.
USPC ............ 362/171; 362/178; 362/190; 362/373

(58) Field of Classification Search
USPC .................. 362/171, 178, 190–208, 294, 373
See application file for complete search history.

(56) References Cited

U.S. PATENT DOCUMENTS

| | | | |
|---|---|---|---|
| 6,921,181 B2 * | 7/2005 | Yen | 362/206 |
| 6,966,677 B2 * | 11/2005 | Galli | 362/373 |
| D536,812 S | 2/2007 | Bayat et al. | |
| 7,281,820 B2 | 10/2007 | Bayat et al. | |
| 7,492,063 B2 | 2/2009 | Bayat et al. | |
| 7,651,240 B2 | 1/2010 | Bayat et al. | |
| 7,738,229 B2 | 6/2010 | Bayat et al. | |
| D622,431 S | 8/2010 | Bayat et al. | |

* cited by examiner

*Primary Examiner* — Anabel Ton
(74) *Attorney, Agent, or Firm* — Whitaker Chalk Swindle & Schwartz PLLC; Stephen S. Mosher

(57) ABSTRACT

A heat sink for a handheld device is found as a one piece chassis for supporting heat-producing circuits inside the device while having heat radiating surfaces outside the device. In another embodiment a battery pack control circuit under microprocessor control allows battery packs having different battery chemistries and characteristics to be interchanged in the same device without switches or adapters. Control of operating modes of the device despite changes in the battery pack including battery chemistry, state of charge, available voltage, or desired operating mode are automatic. The microprocessor measures the battery pack characteristics, using look up tables in a suitable program to adjust the circuit operating modes. The microprocessor also responds to sequential switch contact closures in setting operating modes.

18 Claims, 6 Drawing Sheets

| OPERATING MODE | SWITCH OPERATION | SWITCH CONDITION | VOLTS @ PIN 11 |
|---|---|---|---|
| FLASHLIGHT ON | PRESS AND HOLD PARTLY ON | MOMENTARY ON | Vcc/2 |
| FLASHLIGHT ON | PRESS ON FULL TO LATCH | LATCHED (CLICK, THEN RELEASE) | ~ ZERO |
| FLOODLIGHT ON | PRESS ON FULL TWICE TO LATCH | LATCHED | ~ ZERO |
| BOTH ON | PRESS ON FULL THREE TIMES | LATCHED | ~ ZERO |
| 1 Hz STROBE (FLASHLIGHT) | PRESS ON FULL AND HOLD ONE SECOND, THEN RELEASE | LATCHED | ~ ZERO, THEN Vcc |
| STROBE OFF | PRESS ON FULL AND RELEASE | UNLATCHED | Vcc |
| OFF | RELEASED | UNLATCHED | Vcc |

*FIG. 7*

| BATTERY DETECTION THRESHOLD, VOLTS | | BATTERY TYPE | LIGHT OUTPUT, LUMENS, MINIMUM | LIGHT OUTPUT, DURATION, HOURS |
|---|---|---|---|---|
| LOW | HIGH | | | |
| 5.5 | 10.0 | $LiMnO_2$ | 250 | 3.0 |
| 3.6 | 5.5 | NiMH | 250 | 0.4 |
| 3.3 | 3.6 | NiMH | 170 | 2.5 |
| 3.2 | 3.3 | NiMH | 140 | 1.0 |
| 3.1 | 3.2 | NiMH | 100 | 1.0 |
| 1.8 | 3.1 | NiMH | 25 | 1.0 |
| <5.5 | | NiMH | PROGRAM RESETS TO FRESH BATTERY | |
| | >7.0 | $LiMnO_2$ | PROGRAM RESETS TO FRESH BATTERY | |

*FIG. 8*

HEAT DISSIPATING CHASSIS FOR HANDHELD BATTERY OPERATED DEVICE

CROSS REFERENCE TO RELATED APPLICATIONS

This application is also related to U.S. patent application entitled "Battery Pack Control Circuit for Handheld Battery Operated Device" and U.S. patent application entitled "Programmed Control of a Handheld Battery Operated Device," filed here concurrently.

BACKGROUND OF THE INVENTION

1. Field of the Invention

The present invention generally relates to battery operated tools and appliances and more specifically to apparatus and methods for dissipating heat from heat-producing elements in a compact battery powered device, for controlling operating modes of the device depending on the type of battery used to power the device, and for programming the selection by the user of operating functions.

2. Background of the Invention and Description of the Prior Art

Battery powered tools and appliances have become more versatile and powerful as a result of improvements in battery technology, in the technology of battery powered devices, and in the manufacturing processes used to manufacture and assemble such devices. In particular, more powerful devices are accompanied by the need for more efficient removal of heat from the heat-producing components such as solid state devices, motors, light sources, and the like. This requirement to remove the heat produced by these components becomes more pronounced as products using batteries become smaller and more compact. Even with less heat being produced in smaller devices, components will still have a longer lifetime in general if they are permitted to operate in a cooler environment. In some prior art handheld devices heat produced internally is conducted to a metal housing to be radiated into the surroundings. However, the heating of the housing, which is usually the handle of the device or is otherwise handled by the user, may, in the least, risk discomfort to the user and or improper handling of the device while in use. Thus there is a need for more efficient ways to conduct heat away from heat sources enclosed in compact housings typically used in handheld tools and appliances.

As mentioned above, battery powered tools and appliances have become more versatile and powerful as a result of improvements in technology. In a typical battery powered device, a single type of battery is selected to power the device based on the particular functional needs of the powered device, the current and voltage characteristics of the battery, its size, cost, etc. Heretofore, the ability to interchange batteries or battery packs of differing types or chemistries in the same device has been unavailable. This inability to interchange batteries or battery packs limits the versatility of being able to adapt the device to particular circumstances of use in specific applications. In light duty cases, one type of battery may be most efficient, whereas in heavy duty applications of the same device may require a different type of battery. In other cases a primary battery may be sufficient whereas a secondary or rechargeable battery may be preferred. Further, even different battery chemistries might be used in the same product to advantage in some types of product. With the availability of various battery chemistries of both primary and secondary cells, and the ability of certain handheld tools and appliances to operate in several different modes in a single device, it would be desirable if different types of batteries could be used interchangeably in the same product.

Typically, each instance a new function is added to a tool or appliance requires an additional control to operate it, or at least to combine the control function of the new feature with a control button, knob, or lever provided for an existing feature. Often this requires some practice to use or worse, challenges the dexterity of the user. What is needed is a way to reduce a control action to a simple movement that can be interpreted by intelligence in the device. For example, one of the reasons battery powered tools and appliances have become more versatile functionally is the availability of low cost microcontrollers operable by executable programs. Such controllers can enable removing substantial amounts of circuitry, mechanical control elements, while providing enhanced operating versatility. Accordingly, it would be an advantage to users if battery operated tools and appliances such as handheld lamps, drills, screw drivers, blowers, and the like could be provided with both greater functionality and greater simplicity of operation together in one device.

SUMMARY OF THE INVENTION

Accordingly, the inventions described herein provide new ways to solve the foregoing problems through innovations in electrical and mechanical designs incorporated into an exemplary handheld lighting device. The principles employed are applicable to handheld tools and appliances of many types and not limited to flashlights, work lights, and the like. The embodiments described are provided to illustrate the principles and concepts of the inventions that may readily be adapted to other embodiments without venturing outside the scope of the invention set forth in the appended claims of the invention.

In one embodiment, there is provided a heat dissipating chassis for a handheld battery operated lamp comprising a tubular body having a longitudinal axis, a first open end and a second end; a rim having a radiating surface surrounding the first open end of said body; and a transverse bulkhead disposed across the second end of the body at a right angle with the longitudinal axis; wherein the body, rim, and bulkhead member are configured together in thermally conductive contact with each other.

In another embodiment a battery pack control circuit for a handheld battery operated device is provided comprising first and second terminals for connecting the circuit to the battery pack; a processor in the circuit connected to a memory and having a plurality of A/D inputs coupled to predetermined nodes in said circuit for detecting at least one battery parameter of the battery pack in the circuit to select a corresponding battery identity; and a program stored in the memory and executable on the processor responsive to the corresponding battery identity to select one of a plurality of battery operating modes of the circuit responsive to the battery parameters; wherein the battery operating modes of the circuit are selected based on detection of the battery parameters corresponding to the type of battery pack connected to the circuit.

In several aspects of the above embodiment, different types of battery pack provide different voltage outputs at the first and second terminals of the circuit, and the program comprises: at least one table of values associated with each type of battery pack for determining the operating mode to be selected; wherein the table of values associates a drive current output level with the detected battery parameter.

In yet another embodiment there is provided a battery pack control circuit comprising: first and second terminals for connecting the circuit and the operating load to the battery pack;

a processor in the circuit connected to a memory and having a plurality of A/D inputs coupled to predetermined nodes in the circuit for sensing a plurality of parameters of the battery pack in the circuit to produce a corresponding output for each sensed parameter; and a program stored in the memory and executable on the processor responsive to the corresponding outputs to select one of a plurality of operating modes of the circuit responsive to the type of battery pack connected to the circuit, responsive to the state of charge of the battery pack, and responsive to the operating load upon the battery pack.

In several aspects of the above embodiment, the operating modes of the circuit may be selected regardless of the type of battery chemistry utilized in the battery pack, or may be selected in response to data read from information stored in an electronic chip attached to the battery pack and connected to be read by the processor during execution of the program, the program having look up tables associated in the memory with the data.

In another aspect of the present invention, a method for operating a handheld battery powered device is provided comprising the steps of providing a circuit for operating the battery powered device; providing a programmable microcontroller in the circuit that is operable according to a program; providing a program for operating the microcontroller responsive to respective sensed states of at least one control switch, of signals from either of at least first and second battery packs having different battery characteristics, and of feedback signals from at least one operative load controlled by the microcontroller wherein the program further provides for controlling at least one control output of the microcontroller connected respectively to the at least one operative load in the handheld battery powered device.

In another aspect of the foregoing method the program for operating the microcontroller comprises operating the control switch in a defined sequence within predetermined time intervals to enable a plurality of operating modes of the handheld battery powered device to exceed the number of operative states of the control switch.

In another aspect of the foregoing method the program for operating the microcontroller responds to respective sensed states from either of first and second physically interchangeable battery packs having different battery characteristics.

BRIEF DESCRIPTION OF THE DRAWINGS

FIG. 7 provides a table defining operating modes for operating the embodiment of FIG. 6 of the present invention;

FIG. 8 provides a table of values relating light output, battery pack type, and the state of charge of the battery pack for the illustrated embodiment of the present invention.

DETAILED DESCRIPTION OF THE INVENTION

Figures 1, 2:
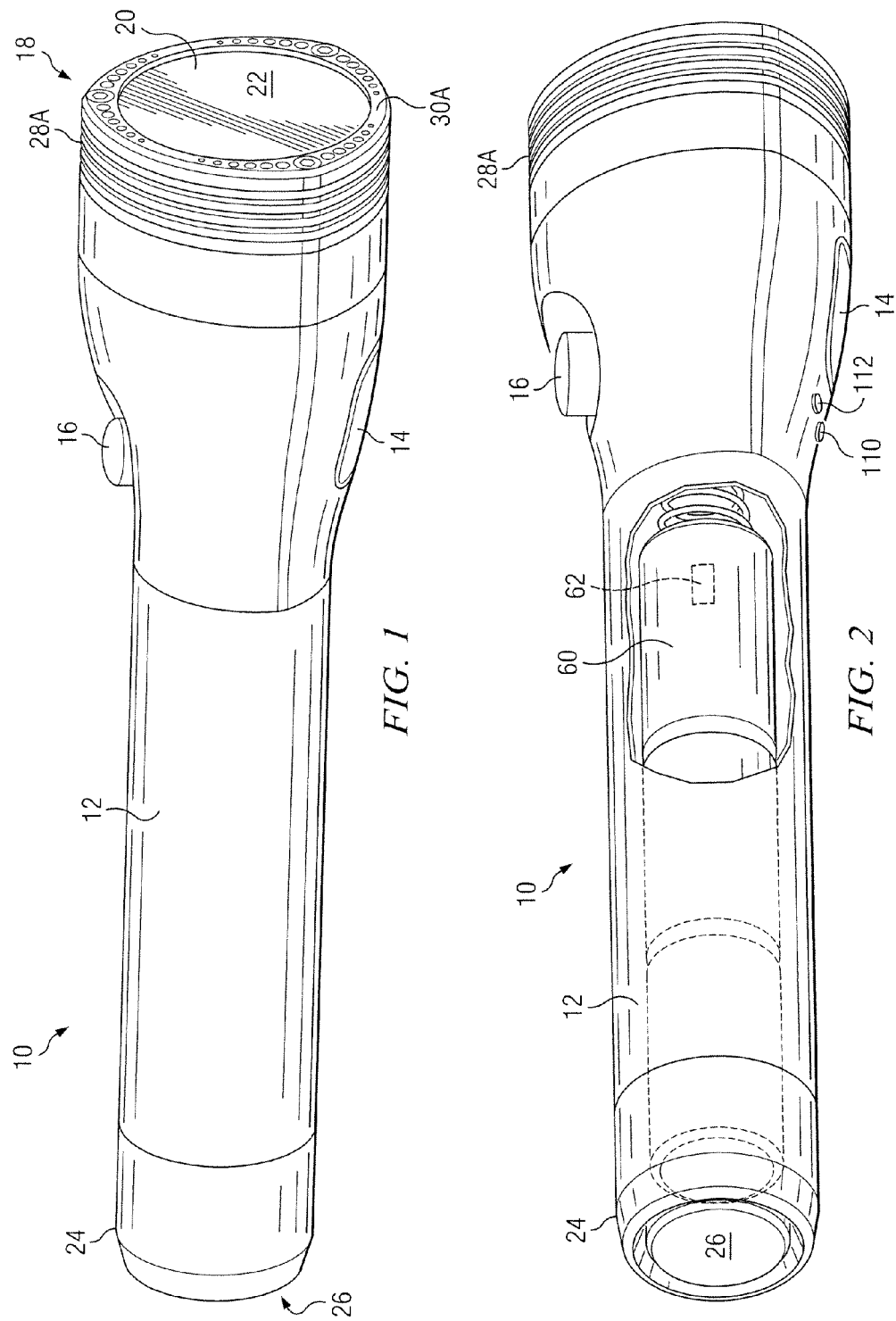
FIG. 1 illustrates a perspective view of one embodiment of An illustrative handheld lamp according to the present invention.
FIG. 2 illustrates a rear perspective view of the embodiment depicted in FIG. 1.

The inventions described herein include a novel heat sink, a circuit that automatically adjusts its output to the voltage output of battery packs having different battery types, and another circuit feature that controls an operating mode according to programmed switch closures. The operating modes may be differentiated as follows. In one mode, the output current drive level may be adjusted according to the battery type and battery charge capacity. In another mode, the output function or load current may be selected according to the state of a multi-state, single pole switch. Further, these features may be employed in a device having two or more levels of output power or distinct output capabilities, thus providing a plurality of operating or functional capabilities in a single convenient, handheld apparatus. In the following description an embodiment is described in which these features provide innovations in electrical and mechanical design as incorporated into an exemplary handheld lighting device. The principles employed are applicable to handheld tools and appliances of many types and not limited to flashlights, work lights, and the like. Handheld tools and appliances may employ different kinds of motive elements such as motors, heaters, and the like. The embodiments described are provided to illustrate the principles and concepts of the inventions that may readily be adapted to other embodiments—i.e., other tools and appliances—without venturing outside the scope of the invention set forth in the appended claims of the invention.

In seeking to improve the versatility and performance of conventional handheld tools and appliances, the following problems were identified in the exemplary case of a handheld lighting device such as a high performance, multi-use flashlight or tactical lighting instrument. (1) Removal of heat from a compact heat-producing circuit or motive element that is fully enclosed in a compact space, without increasing the temperature of the handle or other portions of the device that are routinely touched by a user. A solution to this problem in the case of a handheld light should enable greater illuminating capacity, cooler operation, greater stress margin for longer operating life, and the possibility of a more rugged instrument. (2) Supporting the circuit or motive element and the heat-producing components within a small enclosure and in tight thermal contact with the heat-dissipating element(s) of the device. A solution to this problem requires efficient transfer of heat to the surroundings, and facilitates a unitary assembly that is easy to assemble and disassemble. (3) In a handheld lighting instrument, or a handheld device having one or more heat-producing motive elements packaged within a compact space, a way must be found to integrate the light-producing and/or heat-producing elements or components within the structure of the device without impairing the solutions to problems one and two above. This problem may be solved by integrating the supporting structure for them along with the components of the other functional elements in a chassis structure that doubles as a heat sink.

Continuing with a discussion of problems to be solved by the present invention, (4) providing a compact design strongly suggests minimizing both the amount of circuitry for operating the device and the amount of external control elements needed to control the operation of the device. A solution to this problem is to use a microcontroller under programmed control capable of driving several output power circuits in response to a variety of sense inputs initiated by a user with a minimum of steps or simple operations such as pressing a button. In conjunction with the foregoing solution of a compact chassis/heat sink concept, the microcontroller and user control features must be integrated as much as possible. Accordingly, the present invention to be described solves the foregoing problems by embodying all of these solutions in a single integrated package heretofore unavailable, resulting in a compact, rugged, high performance lighting instrument suitable for demanding uses.

FIG. 1 illustrates a perspective view of one embodiment of an illustrative handheld lamp 10 or flashlight—sometimes called a tactical light—according to the present invention. The handheld lamp 10 includes a housing 12 that has a flood light lens 14, a first ON/OFF button 16, and a head assembly 18. Head assembly 18 includes a finned heat sink 28 with fins 28A. As will be seen, heat sink 28 also functions as a unitary support structure or chassis for the circuitry of the handheld lamp 10. A flashlight or spotlight lens 20 is disposed within the rim portion 30A of the heat sink 28. The lens 20 provides a cover for the illuminating portion of the head assembly while permitting a spotlight beam to emerge with minimal attenuation. Shown within the finned heat sink 28 is disposed a polished reflector 22 that shapes the spotlight beam emanating therefrom to be described.

At the opposite end of the housing 12 of the handheld lamp 10 is a tail cap 24. Indicated as being disposed in the end of the tail cap 24 but not visible in this figure is a second ON/OFF switch 26 to be described. In the following description the finned heat sink 28 may be variously called the unitary support structure 28 or the chassis 28. This is because the heat sink 28 functions as a unitary support structure and a chassis that supports the electrical circuitry of the device 10. Further, because of its unitary, thermally conductive structure, it functions as a heat sink to conduct heat produced in the electrical circuitry to the surroundings outside the housing of the handheld lamp 10. The heat sink 28 with the circuitry supported thereon may also be referred to as the head assembly 18.

FIG. 2 illustrates a rear perspective view of the embodiment depicted in FIG. 1 showing the tail cap 24 and the second ON/OFF switch 26. In the present illustrative embodiment, the first 16 and second 26 ON/OFF switches are connected in parallel and may be configured to independently provide control of the operating modes of the handheld lamp 10 as will be described with reference to FIG. 6. Also shown in FIG. 2 is a battery pack 60 visible through the cut-away portion of the housing 12. In the present illustrated embodiment the battery pack 60 is shown having three cells; however, in other embodiments other numbers of cells may be used without departing from the principles of the invention disclosed herein. Also shown in FIG. 2 is one possible location of an optional battery identification device or chip 62 (ID chip 62) which may be used in some embodiments to enable the storage of battery identification and characteristic information. Such information, available to the control circuitry within the device 10 to adapt to the particular kind of battery pack 60, enables the use of other data besides a voltage representing the terminal voltage of the cells in the battery pack 60 to determine the use of the electrical power provided by the battery pack 60.

Figure 3:
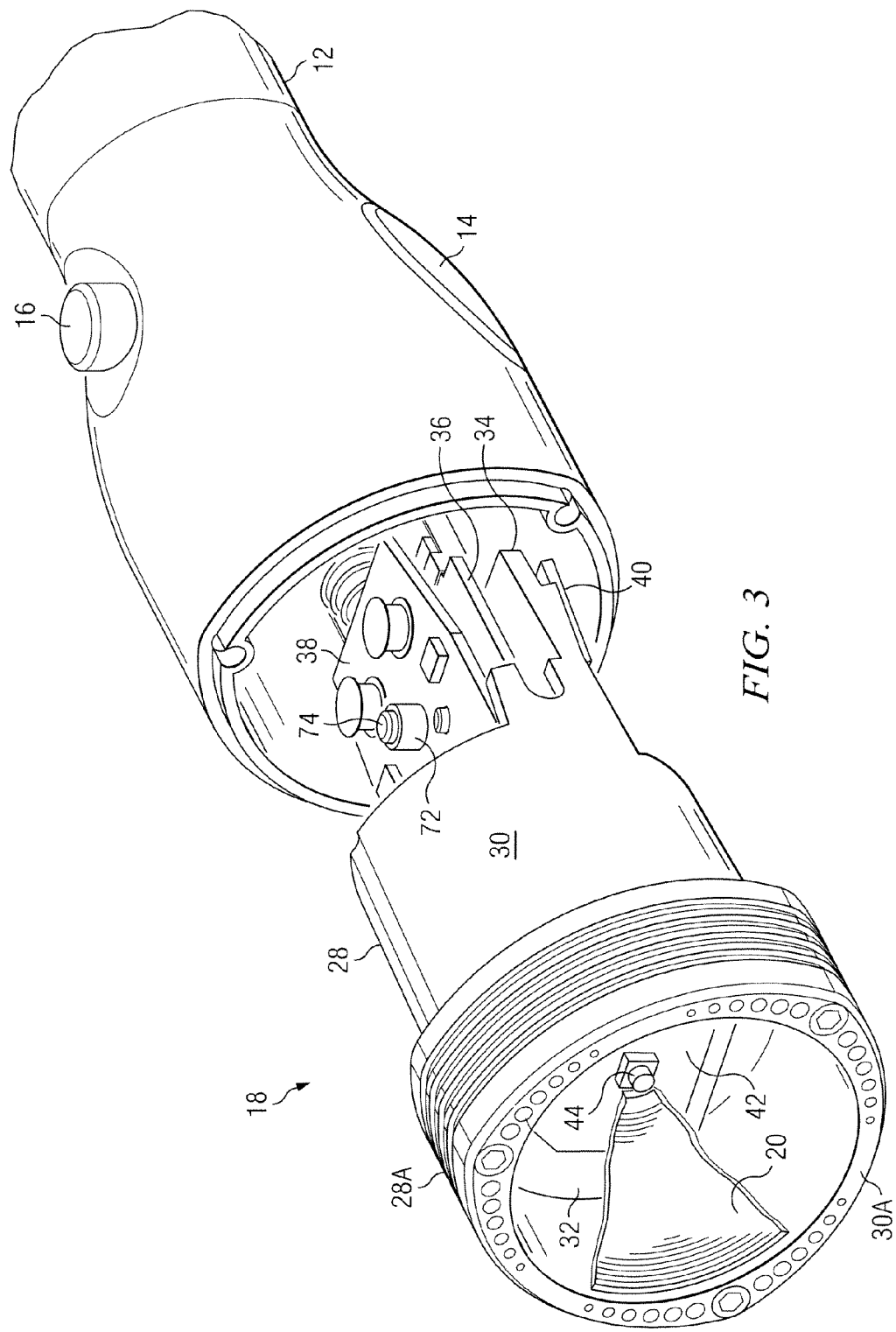
FIG. 3 illustrates a view similar to FIG. 1 but with a head assembly disconnected and partially pulled away from the housing of the lamp to depict the disposition of several printed circuit boards supported by the head assembly, wherein the unitary supporting structure of the head assembly is a heat sink.

FIG. 3 illustrates a view similar to FIG. 1 but reversed end-for-end and with the head assembly 18 disconnected and partially pulled away from the housing 12 of the handheld lamp 10 to depict the disposition of several printed circuit boards (PC boards) supported by the heat sink or chassis 28. The chassis 28 includes a tubular body portion 30 extending rearward into the housing 12 when the head assembly 18 is fully inserted into the housing 12. In the view of FIG. 3, the lens 20 and reflector 22 have been removed to depict a transverse bulkhead 32 disposed across an interior portion of the tubular body portion 30 of the chassis 28. The bulkhead 32 is disposed at a right angle to the longitudinal axis of the handheld lamp 10. The longitudinal axis is shared between the housing 12, and the chassis 28. The transverse bulkhead 32 is disposed rearwardly in the tubular body portion 30 of the chassis 28, and extends across a central portion of the tubular body portion 30. The transverse bulkhead 32 may leave uncovered a partial semi-circular opening in the tubular body portion 30 both above and below the bulkhead 32.

Continuing with FIG. 3, integral with and extending rearwardly away from a lower edge of the transverse bulkhead 32 disposed across the tubular body portion 30 of the chassis 28 is a bulkhead extension 34. This bulkhead extension 34, which is configured substantially as a flat, rearward-extending platform, provides support for first 36, second 38, and third 40 printed circuit boards (PC boards) containing electrical circuits for the operation of the handheld lamp 10 as will be described. In the illustrated embodiment, the handheld device 10, the first PC Board 36 may be supported on short support bosses 46 (not shown in this view for clarity of the figure, but see FIG. 4) extending upward from the bulkhead extension 34. The second PC board 38 may be supported on and just above the first PC board 36 on the aforementioned bosses 46 as described for FIG. 5. The third PC board 40 may be attached to the underside of the bulkhead extension 34 in thermal contact therewith. For example, in the present embodiment, the third PC board 40 has mounted upon it first 80 and second 82 LEDs (light emitting diodes) not visible in this view, but which are disposed in thermal contact with the undersurface of the bulkhead extension 34 through the third PC board 40.

The bulkhead extension 34 is an integral, unitary part of the heat sink 28. This construction enables efficient transfer of heat from the first 80 and second 82 LEDs mounted upon the third PC board 40 (see FIG. 9) into the body of the heat sink 28 to be conducted to the surroundings. In other embodiments, the bulkhead extension 34 may be disposed and/or shaped differently in relation to the transverse bulkhead 32 or the heat sink 28 to meet particular chassis requirements of the handheld device. The essential concept is that the heat sink/chassis 28, including the transverse bulkhead 32 and the bulkhead extension 34, is an efficient conductor and radiator of heat produced by the components mounted upon and in thermal contact with it, and further that it also forms part of the external structure of the device, both functionally and aesthetically.

Further with regard to FIG. 3, there is shown a fourth PC board 42 mounted against and in thermal contact with the forward facing (to the left in the figure) surface of transverse bulkhead 32, which, being an integral, unitary part of the heat sink 28, enables efficient transfer of heat from a third LED 44 mounted upon the fourth PC board 42. To facilitate close thermal contact between each of the third 40 and fourth 42 PC boards against the respective portions (bulkhead extension 34 and bulkhead 32) of the unitary heat sink 28 (aka chassis 28) the PC boards 40, 42 are configured with plating on both sides of the substrate, the plating layers being liberally connected together via plated-through holes as is well known in the art. The conductive portions of the LEDs in contact with the plating of the PC boards may be coated with a thermal compound to ensure adequate thermal conductivity, as is also well known in the art.

Figure 9:
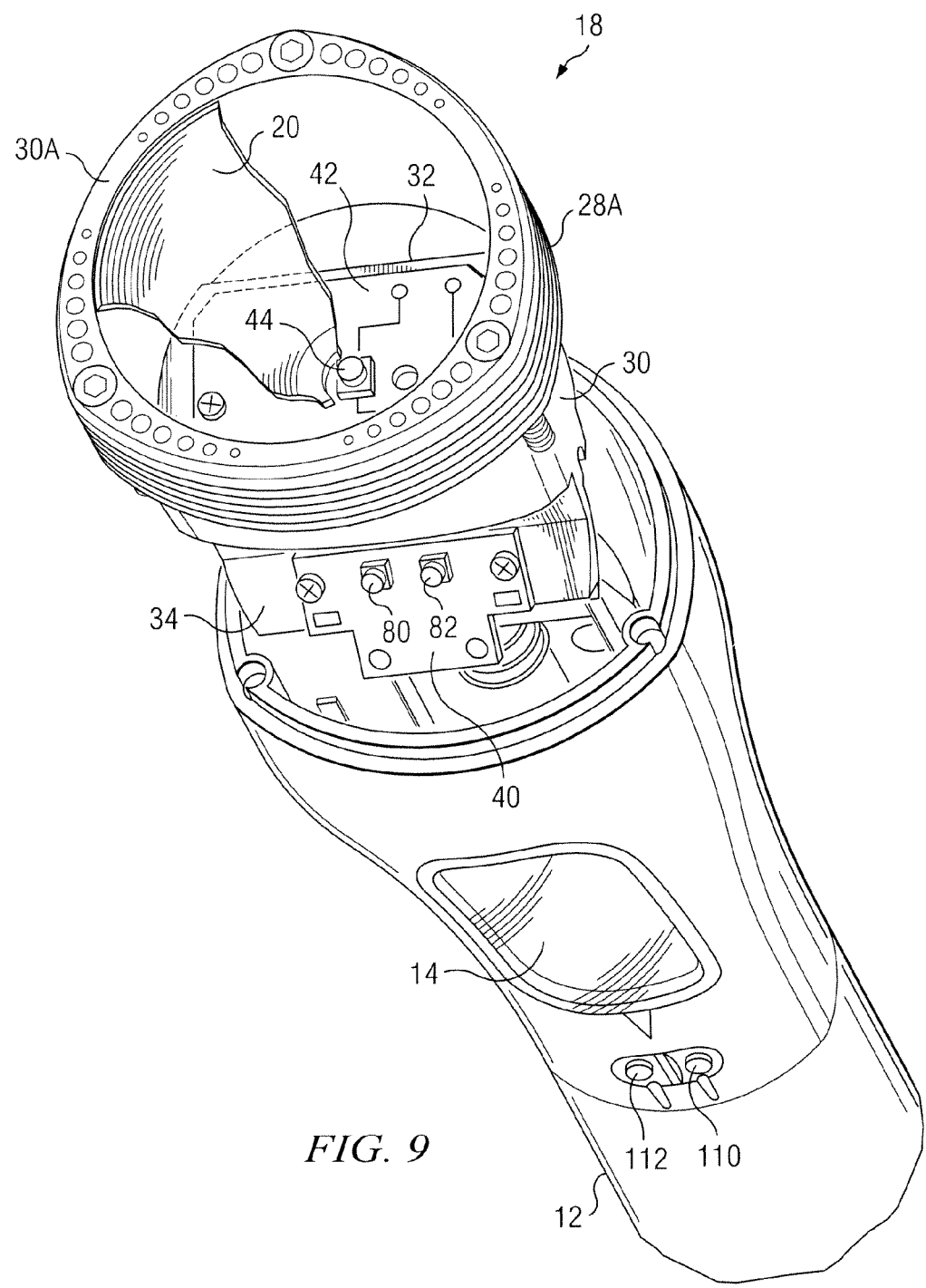
FIG. 9 illustrates a view similar to FIG. 3 but from an underside perspective and with the head assembly disconnected and partially pulled away from the housing of the lamp to depict the disposition of a printed circuit board only partly visible in FIG. 3 that is also supported by the head assembly, wherein the unitary supporting structure of the head assembly is a heat sink.

Persons skilled in the art will recognize that other heat-producing motive devices besides light sources may be mounted upon either or both of the third 40 and fourth 42 PC boards or their underlying surfaces of the heat sink/chassis 28 without departing from the concepts taught by the present invention. Such motive devices, which may be the cases of power semiconductors or motors, for example, may be designated a first motive device 84 that may be mounted upon or supported by the transverse bulkhead 32 acting as a combination heat sink and chassis structure, and a second motive device 86 that may be mounted upon or supported by another portion of the heat sink/chassis 28 such as the bulkhead extension 34 also acting as a combination heat sink and chassis structure. For example, these first 84 and second 86 motive devices may be supported in substantially the same manner as respectively illustrated for the third LED 44 as shown in FIGS. 3 and 9, and the first and second LEDs 80, 82 as shown in FIG. 9.

Figure 4:
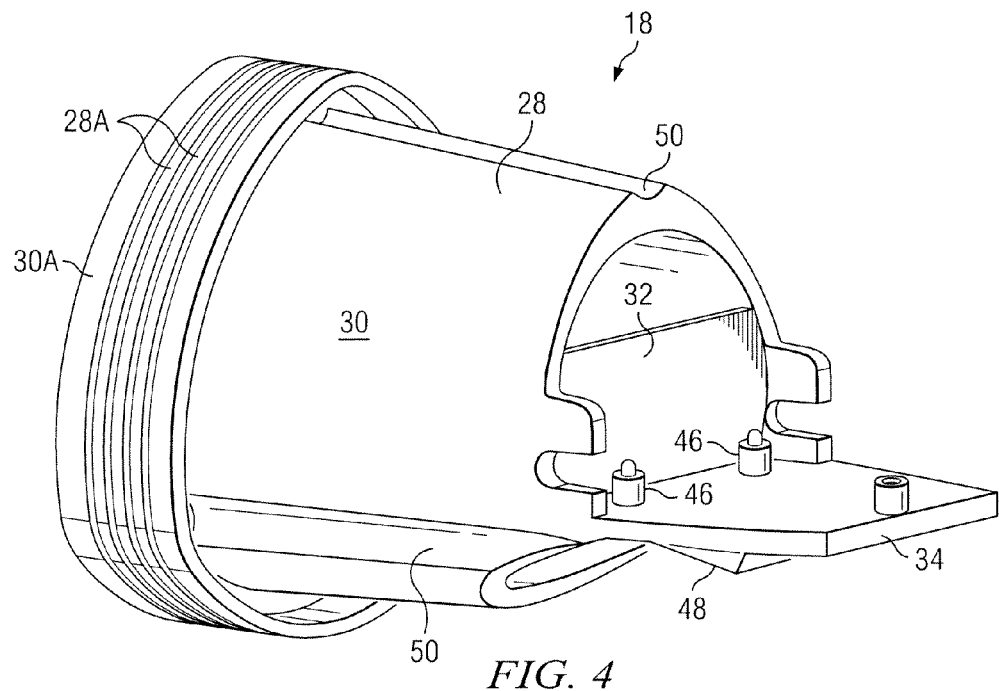
FIG. 4 illustrates a rear pictorial view of the unitary supporting structure, i.e., the heat sink.

FIG. 4 illustrates a rear pictorial view of the heat sink 28 (also known as the unitary supporting structure or chassis 28) according to the present invention. The same reference numbers used heretofore in FIGS. 1, 2 and 3 identify the same structures in the view of the heat sink 28 depicted in FIG. 4. The heat sink 28 is preferably die-cast of aluminum as a single-piece structure and finished after machining in certain areas with a black, hard coat anodize coating. This construction maximizes its ability to conduct heat away from the heat sources in contact with it and radiate the heat into the surroundings. The heat sink 28 includes a tubular body portion 30 and a rim 30A having fins 28A formed therearound. As is apparent in FIGS. 1, 3, and 4, 5, the outer shape of the rim 30A is a curve of constant width having three distinct sides. In the present invention this shape is similar to what is formally known as a Reuleaux triangle. This tri-lobal body shape has an advantage in a handheld lamp because it can be placed on a horizontal surface and retain an orientation of a light beam emitted from one of the "sides" of the body shape toward a target object. This enables hands-free use of the lamp in many commonly encountered circumstances. Further, as a quasi-round bodied structure, it retains the advantages of a round bodied device.

Continuing with FIG. 4, the heat sink 28 includes the bulkhead 32 disposed transversely across the rearward end (to the right in the figure) of the tubular body portion 30 of the heat sink 28. The transverse bulkhead 32, which is configured substantially as a flat panel section oriented perpendicular to the longitudinal axis of the body 12 of the handheld lamp 10, covers approximately a central 40% portion of the circular opening in the rearward end of the tubular body portion 30. Thus, a semi-circular opening appears both above and below the transverse bulkhead 32. Extending rearward from and substantially perpendicular to a lower edge of the transverse bulkhead 32 is bulkhead extension 34. The bulkhead extension 34 is configured as a chassis platform to support most of the circuitry for operating the handheld lamp 10.

Included on the upper surface (facing upward in the figure) of the bulkhead extension 34 may be one or more bosses 46—raised seats for screws or other fasteners—for supporting a PC board or other structure on the bulkhead extension 34. Included on a downward facing surface of the bulkhead extension 34 is a ramp 48 disposed at an angle of approximately 13 degrees in a forward direction from a horizontal plane parallel to the longitudinal axis of the body 12 and the tubular body portion 30 when assembled together as shown in FIG. 1. The purpose of this ramp 48 will be described in conjunction with FIG. 5. It will be appreciated that all surfaces of the unitary heat sink 28 including the transverse bulkhead 32 and the bulkhead extension 34 are configured as thermal contact surfaces to provide thermally conductive paths for the dissipation of heat away from the structures mounted thereon.

Also shown in FIG. 4 are grooves 50 that provide relief for elongated bosses (not shown) formed in the inside surface of the body 12 to receive the screws (not shown) for securing the head assembly 18 to the body 12 when fully inserted therein. The screws may be inserted from the forward end of the handheld lamp 10, through the ribbed portion of the rim portion 30A of the tubular body portion of the heat sink 28 and thence into bosses formed in the inner surface of the body 12. The tubular body portion 30 of the heat sink 28 is slightly tapered for ease of insertion into the body 12 and to provide a slight amount of draft for removal from the die following casting.

Figure 5:
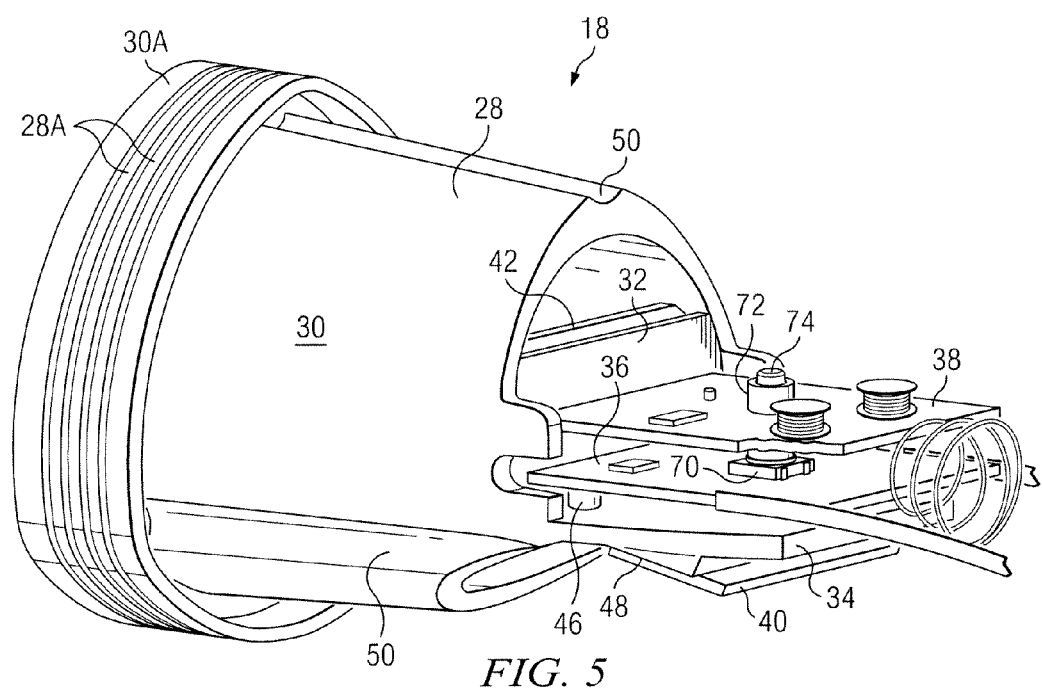
FIG. 5 illustrates the heat sink/unitary supporting structure with the several printed circuit boards attached thereto.

FIG. 5 illustrates the heat sink 28 as shown in FIG. 4 but with the several printed circuit boards (illustrated in FIG. 3) attached thereto, thereby forming a head assembly 18. The head assembly 18 may include all of the operating circuitry of the handheld lamp 10 except for contacts or wiring connecting the circuit boards to the battery pack inside the body 12. The first PC board 36 may be mounted to the bulkhead extension 34 using screws secured in the bosses 46. PC board 36 may include the power supply and microcontroller circuits, and the connections to the switch circuits for switches SW1 (134) and SW2 (138) shown in FIG. 6 to be described. The switch mechanism 70 for SW1 (134) is also shown positioned on PC board 36 and extending upward through a tubular piece 72 passing through PC board 38 that contains a plunger 74 for operating switch mechanism 70. The second PC board 38, which may include components of the buck/boost LED drive circuits, may be supported on PC board 36 on spacers in contact with PC board 36 and/or secured to a rearward side of PC board 42 that is attached to the forward facing side of the transverse bulkhead 32. PC board 38 includes the tubular piece 72 and plunger 74 of the switch mechanism 70 for switch SW1 (134 in FIG. 6) that is operated by ON/OFF push button 16 shown in FIGS. 1 and 2. A third PC board 40, including in this embodiment the flood light components LED2 and LED3, is attached to and in thermal contact with the ramp 48 below the bulkhead extension 34. PC board 40 may include one or more LEDs mounted thereon to provide illumination in a downward and slightly (about 13°) forward orientation, such as to illuminate a path along the ground when the lamp is carried horizontally. A fourth PC board 42, of which only an upper edge is shown in FIG. 5, which may include the flashlight (spotlight) LED1, is attached to and in thermal contact with the forward face of the transverse bulkhead 32 and may be connected electrically to either of the first 36 or second 38 PC boards supported on the bulkhead extension 34. Electrical connections between the PC boards 36, 38, 40 and 42 may be made with wiring or other forms of electrical contact. The conductivity of the thermal contact path may be ensured by the use of thermal compound applied to the surfaces in contact with the heat sink 28.

Figure 6:
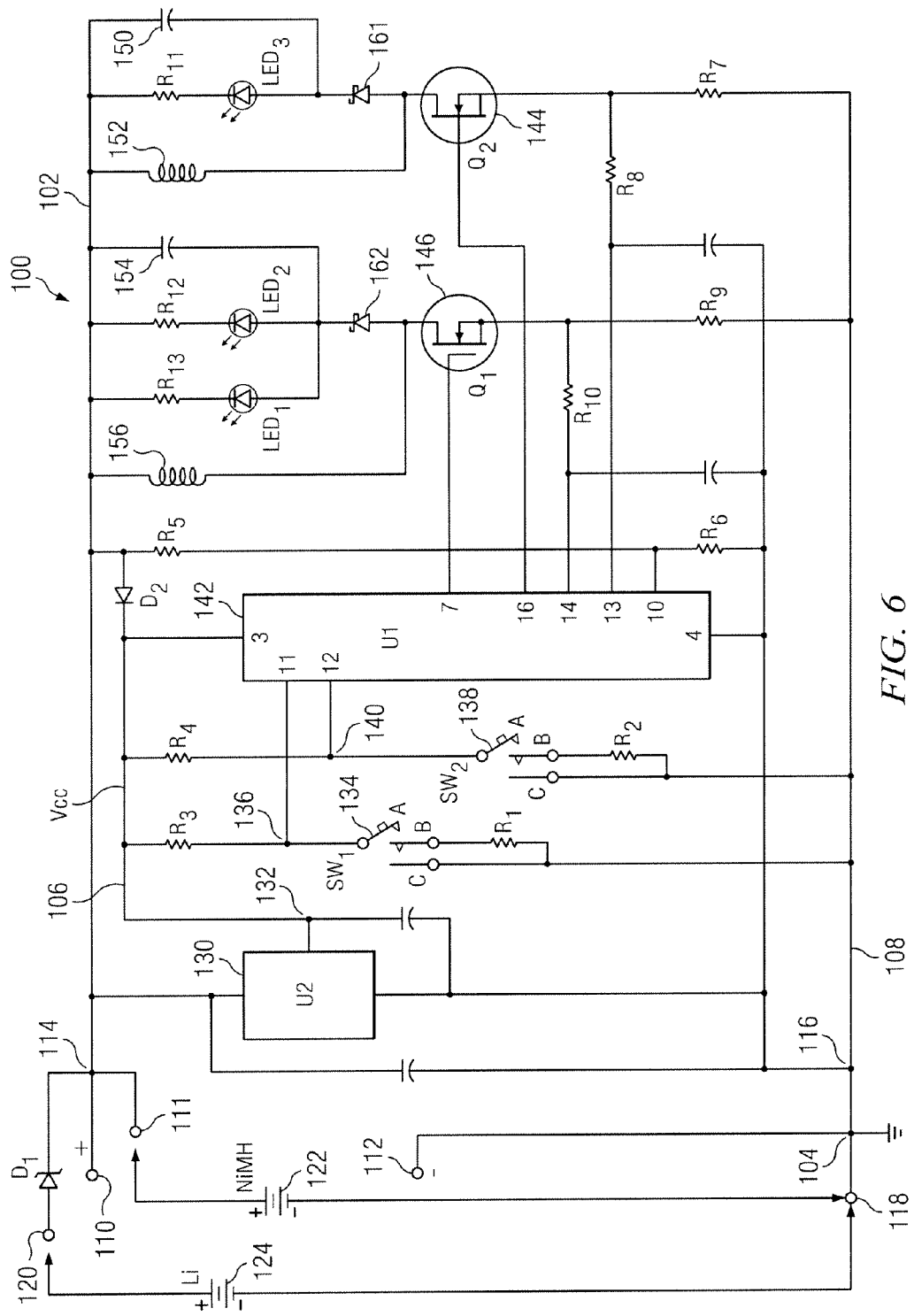
FIG. 6 illustrates a simplified electrical schematic diagram of the circuits disposed on the printed circuit boards in the embodiment described herein.

FIG. 6 illustrates a simplified electrical schematic diagram 100 of the circuits that may be disposed on the printed circuit boards 36, 38, 40 and 42 in the embodiment described herein. In this embodiment, a plurality of small PC boards are used to enable packaging the circuitry into a relatively small volume within the dimensions of the heat sink 28, and to enable location of two different light sources to produce their respective outputs in different directions. This particular choice of mechanical configuration and packaging is not to be construed as limiting the principles of the present invention but merely one illustrative variation thereof. The circuit 100 includes an unregulated DC voltage supply bus 102 and a ground return bus 104. A regulated DC voltage and current is provided on DC bus 106 by voltage regulator 30 (U2, which is isolated from the unregulated bus 102 by the diode D1. A common return path 108 provides a return path for the regulated DC current to the common terminal of the voltage regulator. The regulated DC voltage output is provided at terminal 132 of the voltage regulator. In the present illustrative embodiment the value of this regulated DC voltage may be, for example, 2.5 volts. The output and supply terminals of the voltage regulator may be decoupled to the common return 108 by suitable capacitors.

DC power may be supplied to the circuit by either of two different battery packs. The battery packs may be interchangeably connected between the node 114 on the unregulated supply bus 102 and the terminal 118 on the ground bus 104. In the figure, a rechargeable NiMH battery pack 122 (3 cells, Vpeak=5.5 Volts) may be connected with its negative terminal connected to terminal 118 and its positive terminal connected to terminal 111. Alternatively, a LiMnO$_2$ primary cell 124 (3 cells, Vpeak=10 Volts) may be connected with its negative terminal connected to terminal 118 and its positive terminal connected to node 114 through a terminal 120 and a blocking diode D1 connected between terminal 120 and the node 114. The blocking diode is connected so as to prevent the drive circuit from charging a primary cell.

In the illustrated embodiment both battery packs contain three cells of sub-C size, which may be arranged in an insulated battery sleeve (not shown) for ease of handling. The rechargeable ("secondary") NiMH pack 122 typically provides 4.2 to 4.4 Volts at full charge, and may deliver useful power in the range of 1.8 to 5.5 Volts. The Lithium primary pack 124 (also called Li pack 124), which in this example may employ a LiMnO$_2$ battery chemistry, will supply an output in the range of 9.7 to 10.2 Volts. Recharging of the NiMH pack 122 is accomplished by connecting a charging voltage to node 114 via terminal 110 and to the ground return terminal 112. Terminals 110 and 112, shown in FIGS. 1 and 2 may be disposed on the outside of handheld lamp 10 to facilitate connecting a battery charger. As mentioned, blocking diode D1 prevents charging current from reaching the Li pack 124 battery.

The use of two different battery types configured in interchangeable battery packs having different voltage outputs as described herein above is just one example of the use of multiple battery types or chemistries that may be deployed in various versions of the same basic handheld lighting device 10. This versatility enables satisfaction of a variety of market needs or, in some cases, several different applications of a single product. For example, a user of the handheld light 10 according to the present invention may substitute one type of battery pack for another to meet the requirements of a particular use of the device.

Continuing with FIG. 6, the circuit is seen to include first and second driven loads, respectively driven by switching transistors Q1 and Q2. Q1 and Q2 may be selected for particular applications according to requirements for current handling ability, switching speed, power dissipation, package size, etc. Q1 and Q2 are each connected in a buck/boost circuit to supply operating current to their respective loads regardless of the available power supply voltage. The drive control to the gates of Q1 and Q2 is provided by microController U1, which may also be designated as "uC 142" or as a "processor" or a "computing device," which are understood to be terms having the same meaning, i.e., as computing devices operating under programmed control. U1 (uC 142) may be an 8-bit microController having, for example, the capabilities of a 10-bit analog-to-digital converter, eight to twelve general purpose I/O pins, an ability to produce PWM outputs, and at least two drive current control outputs sufficient to drive two driver devices to current loads of up to 1.0 Ampere, and which operates according to an executable operating program to be described that may be stored in a memory embedded within uC 142. One example of such a device is a member of the MC9S08QG814 series available from Freescale Semiconductor.

The operating program for uC 142 selects the appropriate gate of Q1 or Q2 in response to the switch sequence entered by the user with either SW 1 or SW2. Note that, because SW 1 and SW2 are connected in parallel with separate outputs, it is the sequence used at either switch rather than the particular switch that is operated that determines the selection of Q1 or Q2 (corresponding the flashlight or flood light output). Feedback from Q1 and Q2 is provided from resistor networks in the respective source terminals of transistors Q1 and Q2 and coupled to inputs of the uC 142. Control of the operating program may be initiated by either of the switches SW1 (134) or SW2 (138) located on an external portion of the housing or body 12. These switches 134,138 are connected in voltage divider circuits to apply specific voltage signals to the uC 142. These signals, selected by the positioning of the actuator buttons of either SW1 or SW2 are interpreted by the program stored in the uC 142 to apply an appropriate drive signal to the driven loads in accordance with the operating requirements desired by the user.

In an alternate embodiment of the present invention, the uC 142 may be programmed to respond to data stored in a battery identification device such as a battery ID chip or RFID tag attached to or incorporated within the battery pack. The data may be read by the uC 142 during execution of a program, the program having look up tables associated in said memory with said data. A battery identification device 62 may be located within the battery pack 60 as indicated by the broken line outline in FIG. 2. The battery ID device 62 may be read and the information received via means well known in the art. For example, a one-wire bus may connect the unregulated power supply bus 102 to an available input of the uC 142 and suitably programmed to convey battery parameters useful in controlling the use of the battery pack in the handheld device 10. Alternatively, an RFID tag used in place of the battery ID chip 62 may be read by remote wireless communication to provide data about the battery pack to the uC 142.

In the illustrated example, SW1 (134) and the associated push button 16 may be located on the top side of the body 12 as shown in FIG. 1, while SW2 (138) and the associated push button 26 may be located in a tail cap 24 of the body 12 as depicted in FIG. 2. As shown in FIG. 6, switches 134, 138 are connected as parallel control elements so that either switch may be used to control the illumination output of the handheld lamp 10. Switches 134, 138 may preferably be push-button snap-dome tactile keyboard style switches configured to provide three positions including OFF, ON momentary, ON latched, in a linear, push-button sequence of three operative states. The first position or state of switches SW1 (134) or SW2 (138) (OFF, or open) is an open branch circuit, the second position or state (ON momentary or part way ON) inserts a resistor in the branch circuit, and the third position or state (ON—fully ON) short-circuits the resistor. In the third position, the uC 142 interprets the switch state as being latched ON, even though the switch is not physically latched. This type of operation is similar to the Caps Lock or Num Lock switches in a typical keyboard. When the button is pressed again, the switch returns to its first position or state. Each position applies a different DC voltage to a respective terminal of U1 to initiate a selected operating mode for the driven loads.

The table in FIG. 7 defines the operating modes or states that correspond to various operations of either switch 134 or 138. Note that because of the way in which the user operates the switch, the number of possible operating modes can exceed the number of possible operating states or conditions of the switch. For example, in FIG. 7, seven operating modes are listed in the "Operating Mode" column of the table, responsive to operation of the switch as described in the "Switch Operation" column and to the position or state of the contacts of the switch as shown in the "Switch Condition" column, which correspond to the switch operations. The program in the microcontroller keeps track of the operations of the switch within defined time intervals, thereby enabling the plurality of operating modes that exceeds the number of possible states of the contacts of the switch.

In the table of FIG. 7, there are seven operating modes defined for operating the dual function handheld lamp of the present invention. The modes include a flashlight or spotlight mode produced by the LED 1 of FIG. 6 (i.e., LED 44 of FIG. 3) that provides a narrow, focused, very bright beam for illuminating objects at a distance or in areas that are dimly lit wherein the object(s) of interest are indistinct. The second basic mode is a flood light mode produced by LEDs 2 and 3 of FIG. 6 that provides a bright but more broadly shaped beam for illuminating less distant areas with a broader illumination coverage. A third mode provides illumination in both modes simultaneously as, for example, may be needed when walking along a path. A fourth mode provides a continuous strobe mode of the flashlight beam for signaling applications or when it is necessary to conserve battery power. To turn any mode OFF, i.e., to exit a mode, simply press either switch until it clicks, then release the button to open the contacts and return the voltage applied to pin 11 or 12 to Vcc. In a variation not shown in the table of FIG. 7, the strobe mode may also be activated automatically at reduced brightness when the voltage available from the battery pack falls below a minimum threshold.

The lighting modes are distinguished by several parameters: (a) the voltage applied to pin 11 or 12 of the uC 142 corresponding to operation of switches 134, 138; (b) the number of times within a predetermined interval a switch is operated; and (c) the length of time the switch is held in a fixed state. As an example, the voltage applied is determined by whether the switch is not pressed (Vcc, or, in the illustrated example, 2.5 Volts), or pressed but not to full latch (Vcc/2 Volts), or fully pressed and "latched" (~zero Volts). In the circuit of FIG. 6, the voltage available to signal the uC 142 is determined by the action of the voltage divider formed by Resistor R3 and R1 (or R4 and R2). The voltage available is the ratio of the value of R3 to R3+R1. If R3 and R1 are equal, the ratio is 1/2, and the voltage at pin 11 of uC 142 is Vcc/2. Since the circuits are the same for either SW1 or SW2, that calculation is the same. The number of times the switch is operated may be tracked by a counter that detects the number of times the voltage drops below Vcc−(Vcc÷5) Volts, for example, within a given nominal time interval. The length of time the switch is held ON before being released may be counted by a timer to control the 1 Hz. strobe mode. One special automatic use of the strobe mode is activated if the voltage output of the battery pack is below a preset minimum threshold to indicate when the battery pack must be replaced or recharged. Persons skilled in the art may use the foregoing information contained in the table of FIG. 7 and the interpretation provided herein to compose the program necessary to accomplish the desired modes. One embodiment of such a program may include a look up table that associates output signals that correspond with the various input conditions and operating modes. The illustrative example is provided to describe the concepts of the present invention but not to limit the possible variants of the basic concept as set forth in the claims of the invention appended hereto.

Continuing with FIG. 7 the operating modes are listed in the not mal sequence, from the top of the table to the bottom, although any mode may be accessed individually. A momentary condition means that the contacts A and B of the SW1 or SW2 are in a make state; that is, the wiper A contact is moved sufficiently to contact the wiper B contact, which, because of the action of the voltage divider (R3 and R1, or R4 and R2), applies a voltage of Vcc/2 to the input (pin 11 or 12) of the uC 142. A latched condition means that both the wiper A contact and the wiper B contact have moved together to make full contact with the C contact, thereby shorting the lower resistor (R1 or R2) and applying zero volts to the input of uC 142. An "unlatched" or open condition means that the wiper A contact has returned to its released, quiescent condition, allowing the value of Vcc to be applied to the input of the uC 142.

Returning to the so-called latched condition, the switches SW1 and SW2 in the illustrated embodiment do not actually have a mechanically latched state. Instead, when the switch button is fully depressed, and zero Volts are applied to the respective input of the uC 142, the program interprets the zero Volts as a latched condition and determines the output drive signal that corresponds with the zero Volts condition. This feature enables either SW1 or SW2 to be used independently to signal the momentary operating mode and only causes activation of the corresponding light source as long as the SW1 or SW2 is partly depressed. This feature also enables the switches to signal the uC 142 the three different switch conditions over only two wires. Thus, full depression of either switch programs the light modes as follows: first full depression=flashlight ON; second full depression=flood light ON; and third full depression=both flashlight and flood lights latched ON (also known as a "dual" mode). A timer may be used to limit the time available to sequence through the switch states to the desired mode.

The illustrated embodiment provides a method of using sense inputs of a single programmed uC to control at least two device outputs or output loads (LED1, and LED2+LED3) based on independent activation of (A) at least two control switches (SW1 and SW2), of (B) at least each of a plurality of operative states of each of said switches (there are three operative states in SW1 and SW2), and based on (C) detection of at least two different battery pack types (the NiMH and LiMnO$_7$). This is readily apparent from the circuit shown in FIG. 6 and the operation of the program stored in the uC as detailed in the tables set forth in FIGS. 7 and 8. It will also be apparent to persons skilled in the art that the ability to select different loads, as can be represented by LED 1 as one load and LED2+LED3 as another load, and adapt to the current demands of each is provided by the present invention. This capability, whether automatically by sensing current or voltage in the circuit during use or manually by selection using a switch as described herein, may be readily adapted to battery powered hand tools such as drills, screwdrivers, and the like, or small appliances such as vacuum cleaners, blowers, fans, etc.

Returning to FIG. 6, two driven loads are connected between the unregulated supply bus 102 and the ground return bus 104. In the broader application the driven loads could be various kinds of devices that require electric current to operate. In the present illustrative example the driven loads are LED (light emitting diode) circuits. A first driven load includes LED1 and its control transistor 144, i.e., Q1, connected in a buck/boost circuit. Q1 is shown as a Field effect transistor in this simplified example to represent that a solid state switching device is a suitable choice of active element for such a circuit. Persons skilled in the art will recognize that a variety of solid state or semiconductor devices may be used with only slight variations on the circuit as depicted herein. The drain of transistor 144 is connected through a blocking diode 161 in series with LED 1 and R11 to the supply bus 102. Also connected between the drain of transistor 144 is an inductor 152. Connected in parallel across LED1 and the resistor R11 is a capacitor 150. The source terminal of transistor 144 may be connected via resistor R7 to provide a source path for the current in transistor 144 and to provide a feedback signal via the resistor R8 to a pin 13 of the uC 142. In operation, when transistor 144 is ON, the inductor 152 is charged and energy is stored in the magnetic field of the inductor 152. When transistor 144 turns OFF, the blocking diode 161 conducts, the field around inductor 152 collapses, and current flows in both LED1 and capacitor 150. Upon the next cycle when transistor 144 turns ON, capacitor 150 delivers current to LED 1. Thus, LED1 receives a substantially constant current as long as transistor 144 receives a periodic drive pulse signal from pin 16 of the uC 142 to the gate of transistor 146.

The second driven load is nearly identical with and operates the same as the first driven load in this example and includes LEDs 2 and 3, along with their respective series resistors R12 and R13, connected in parallel between the cathode of the blocking diode 162 and the supply bus 102. The anode of the blocking diode 162 is connected to the drain of Field Effect Transistor 146, i.e., Q2, also connected in a buck/boost circuit. Transistor 146 may have a different current and power handling rating than transistor 144 because the load current to charge the inductor 156 and capacitor 154 to support the current requirements of the LED2/LED3 combination may be different. The drain of transistor 146 is connected through the blocking diode 162 in series with LEDs 2 and 3 and resistors R12 and 13 to the supply bus 102. Also connected between the drain of transistor 146 is the inductor 156. Connected in parallel across the LEDs 2 and 3 and the resistors R12 and 13 is a capacitor 154. The source terminal of transistor 146 may be connected via resistor R9 to provide a source path for the current in transistor 146 and to provide a feedback signal via the resistor R10 to a pin 14 of the uC 142. In operation, when transistor 146 is ON, the inductor 156 is charged and energy is stored in the magnetic field of the inductor 156. When transistor 146 turns OFF, the blocking diode 162 conducts, the field around inductor 156 collapses, and current flows in both LEDs 2 and 3 and capacitor 154. Upon the next cycle when transistor 146 turns ON, capacitor 154 delivers current to the LEDs 2 and 3. Thus, LEDs 2 and 3 receive a substantially constant current as long as the transistor 146 receives a periodic drive pulse signal from pin 17 of the uC 142 to the gate of transistor 146.

The pulses delivered to the respective gates of the transistors 144 and 146 controlling the first and second driven loads may, in this example operate at approximately 250 KHz and a variable duty cycle depending on the load and available supply voltage, as is well known in the art. In the present embodiment, both the ON time of the transistors 144, 146 and the duty cycle of the pulse signal coupled to the gates of the transistors varies inversely with the magnitude of the supply voltage. It will be apparent to persons skilled in the art that the circuit adjusts to both the available voltage from the battery pack and the load upon the drive circuit. To maintain a constant brightness illumination from the LEDs the circuit employs the adaptability of the buck/boost drive circuit to compensate for the gradual decrease in the voltage available from the battery pack 60 to activate the LEDs. When the battery is fully charged, the buck/boost circuit operates in the "buck" mode by bucking the voltage applied across an LED downward to approximately 3.2 Volts. 3.2 Volts is the nominal forward voltage required for the LED (this applies to LED 1 or the pair LEDs 2 and 3) to provide its rated brightness. As the battery discharges and the voltage available to the LED drops below 3.2 Volts, the circuit switches its PWM current drive outputs from the uC 142 to operate in the "boost" mode and boosts the available voltage applied across the LED to supply the required 3.2 Volts. As an example, the circuit may switch to a boost mode as the available voltage drops below the minimum value when operated with a NiMH battery pack.

In FIG. 8 is provided a table of values relating light output, battery pack type, and the state of charge, in terms of voltage available, of the battery pack. The program in the uC 142 is configured to sense the instant available voltage from the battery pack and determine a corresponding drive level to apply to the transistors 144, 146 for driving the driven loads, depending upon which particular state either one of the switches 134, 138 is operated in. In the first column on the left in the figure are the Battery Detection Threshold Voltages, provided for both low and high values to denote the operating ranges that correspond to the available power output. In the illustrative example, the power output is the light output expressed in Lumens, determined according to the ANSI/NEMA Standard FL-1 *"Basic Flashlight Performance Standard,"* and is shown in the third column. The second column identifies the battery type (by its chemistry), and the last column on the right provides an estimate of the duration of the light output corresponding to the Lumens value in column three.

Further, as described herein above, when a $LiMnO_2$ primary battery is discharged, an automatic strobed light output at reduced power signals the need to replace the battery pack. When a NiMH battery pack is used, the condition of the battery is indicated by the relative dimness of the light output as shown in the table of FIG. 8. A discharged battery pack may be replaced by a battery pack of either type. A discharged NiMH battery pack may be recharged while in the handheld lamp 10 using contacts 110, 112 provided on the outside of the housing 12 as shown in FIG. 2 when placed on a suitable charging system. In the last lines of the FIG. 8 are shown that the program resets when a fully charged NiMH or a fresh $LiMnO_2$ battery pack is installed in the housing 12 of the handheld lamp 10 by removing the tail cap 24 and the old battery pack 60, installing the fresh battery pack and replacing the tail cap 24. Once the battery pack is replaced and the program reset, the program remains in the operating mode corresponding to the battery pack type until the battery pack is replaced. The voltage measured at pin 10 indicates which type of battery pack installed. If the voltage measured is less than 5.5 Volts, the program senses that a NiMH battery pack was installed and selects the drive currents appropriate to the available power supply voltage; if greater than 7.0 Volts, the new battery Pack contains $LiMnO_2$ cells, and the uC 142 adjusts the drive current accordingly.

Persons skilled in the art may use the foregoing information contained in the table of FIG. 8 and the interpretation provided herein to compose a program necessary to accomplish the desired operating modes. One embodiment of such a program may include a look up table that associates output signals that correspond with the various input conditions and operating modes.

In the illustrated embodiment, two battery types are described, along with the operation of the program of the uC 142 that automatically adapts to the types of battery pack 60 by detection of the voltages output from the battery pack 60. Other battery types, presently known or that may be available in the future may be used and may be preferable in some applications depending on the type of function provided by the tool or appliance. Certainly the battery capacity per unit volume is an important parameter, along with the particular voltage, package size, etc. For example, certain other types of alkaline or NiCad chemistries may be selected. Further, if, for example, a NiCad battery pack is selected, the requirements of the battery charger may be specified for the particular use. Further, while the illustrated embodiment senses the voltage output of the battery pack 60 to adjust the circuit operation to the type of battery pack that is installed, other embodiments may be configured to read identification information from a chip contained in the battery pack and use the information stored therein to select or adapt the uC 142 operating program to match the characteristics of the battery pack.

Referring to FIG. 9, there is illustrated a view similar to FIG. 3 but from an underside perspective and with the head assembly 18 disconnected and partially pulled away from the housing 12 of the handheld lamp 10 to depict the disposition of a printed circuit board only partly visible in FIG. 3. This PC board 40, which also includes the first 80 and second 82 LEDs mounted thereon is also supported by the head assembly 18, wherein the unitary supporting structure of the head assembly 18 is also a heat sink/chassis 28. The first 80 and second 82 LEDs, the third PC board 40 and the bulkhead extension 34 of the tubular body 30 of the heat sink 28 are all in thermal contact with each other as previously described. Other reference numbers shown in FIG. 9 that are the same as in FIG. 3 identify the same structures as shown and described previously in the figures. The third PC board 40 and the first and second LEDs 80, 82 mounted thereon could be replaced by another motive device, designated herein elsewhere as motive device 84. Motive device 84 may be one or more power semiconductors or motors or heat sources wherein the case(s) of the respective motive device(s) are preferably mounted and maintained in thermally conductive contact with the surface of the bulkhead extension 34 to enable heat to be readily conducted away from the first motive device 84 and radiated into the surroundings. Similarly, a second motive device 86 may be disposed in place of the third LED 44 and fourth PC board 42 that are supported on the transverse bulkhead 32, such that heat generated in the second motive device 86 may be maintained in thermally conductive contact with the surface of the transverse bulkhead 32 to enable heat to be readily conducted away from the second motive device 86 and radiated into the surroundings.

While the invention has been shown in only one of its forms, a handheld lighting device, it is not thus limited but is susceptible to use in a variety of handheld tools and appliances as mentioned herein and to various changes and modifications suggested in the foregoing descriptions without departing from the spirit thereof.

What is claimed is:

1. A heat dissipating chassis for a handheld device, comprising:
    a tubular body having a longitudinal axis, a first open end and a second end;
    a rim having a radiating surface surrounding said first open end of said body;
    said body and said rim having a circular internal cross section and a tri-lobal external shape; and
    a transverse bulkhead disposed across an interior portion of said second end of said body at a right angle with said longitudinal axis; wherein
    said body, rim, and transverse bulkhead are formed as a unitary component of a single thermally conductive material.

2. The apparatus of claim 1, further comprising:
    a bulkhead extension configured for supporting a second light source in thermal contact therewith and extending from and in thermal contact with said transverse bulkhead and extending away from said first open end.

3. The apparatus of claim 1, wherein said transverse bulkhead is configured for supporting a first light source in thermal contact therewith such that heat from said first light source is conducted via said heat dissipating chassis and light from said first light source is directed through said tubular body and said open first end substantially along said longitudinal axis.

4. The apparatus of claim 2, wherein said bulkhead extension is configured for supporting a second light source in thermal contact therewith such that light from said second light source is directed radially relative to said longitudinal axis.

5. The apparatus of claim 2, wherein said transverse bulkhead and bulkhead extension cooperate in supporting drive circuitry for at least one of said first light source and said second light source in thermal contact with said respective transverse bulkhead member and said bulkhead extension.

6. The apparatus of claim 1, wherein said radiating surface of said rim includes a plurality of fins in thermal conducting contact therewith.

7. The apparatus of claim 6, wherein said radiating surface of said rim includes a plurality of circumferential fins in thermal conducting contact therewith.

8. The apparatus of claim 1, wherein said tubular body is further configured for receiving a light reflecting shell within said circular internal cross section extending from said transverse bulkhead toward said rim.

9. The apparatus of claim 1, wherein said tubular body, except for said rim, is configured for insertion into a first head end of a lamp housing.

10. The apparatus of claim 4, wherein said bulkhead extension configured for supporting said second light source is oriented substantially parallel with said longitudinal axis.

11. The apparatus of claim 10, wherein said bulkhead extension includes a ramp on an underside thereof enabling said second light source to direct its beam of light in a forward direction slightly less than 90 degrees relative to said longitudinal axis.

12. The apparatus of claim 1, said tubular body further comprising:
    an internal surface configured to reflect light emitted by said first light source in a direction along said longitudinal axis and away from said first open end of said body.

13. The apparatus of claim 12, wherein said internal surface includes a reflective insert shell having a reflective coating.

14. The apparatus of claim 1, wherein said transverse bulkhead occupies and is disposed across a central portion of the cross section of said second end of said tubular body.

15. The apparatus of claim 1, wherein said transverse bulkhead is configured for supporting a first heat-producing source in thermal contact therewith such that heat from said first heat-producing source is conducted via said heat dissipating chassis to be radiated therefrom.

16. The apparatus of claim 2, wherein said bulkhead extension is configured for supporting a second heat-producing source in thermal contact therewith such that heat from said second heat-producing source is conducted via said heat dissipating chassis to be radiated therefrom.

17. The apparatus of claim 2, wherein said transverse bulkhead and bulkhead extension cooperate in supporting drive circuitry for at least one of said first heat-producing source and said second heat-producing source in thermal contact with said respective transverse bulkhead member and said bulkhead extension.

18. The apparatus of claim 1, wherein said radiating surface of said rim includes a plurality of fins in thermal conducting contact therewith.

* * * * *

UNITED STATES PATENT AND TRADEMARK OFFICE
CERTIFICATE OF CORRECTION

PATENT NO.        : 8,562,169 B2  
APPLICATION NO.   : 12/956973  
DATED             : October 22, 2013  
INVENTOR(S)       : Mark Kempter Page 1 of 1

It is certified that error appears in the above-identified patent and that said Letters Patent is hereby corrected as shown below:

Title Page: Item 57

Line 1 of the Abstract should read:

"A heat sink for a handheld device is formed as a one piece"

Signed and Sealed this  
Tenth Day of December, 2013

Margaret A. Focarino  
*Commissioner for Patents of the United States Patent and Trademark Office*